(12) United States Patent  
Perez (10) Patent No.: US 7,764,570 B2
(45) Date of Patent: Jul. 27, 2010

(54) FEEDBACK PROTECTION OF PRESSURE MEASUREMENT DEVICES

(75) Inventor: Jason R Perez, Renton, WA (US)

(73) Assignee: The Boeing Company, Chicago, IL (US)

( * ) Notice: Subject to any disclaimer, the term of this patent is extended or adjusted under 35 U.S.C. 154(b) by 553 days.

(21) Appl. No.: 11/421,189

(22) Filed: May 31, 2006

(65) Prior Publication Data

US 2007/0280046 A1 Dec. 6, 2007

(51) Int. Cl.
*H04B 17/00* (2006.01)

(52) U.S. Cl. ...................................... 367/13

(58) Field of Classification Search ............ 367/13, 367/93, 99, 127, 140, 900, 902; 73/620, 73/599, 633, 627, 598, 600; 340/550, 566, 340/621, 582, 583, 580, 962; 702/159; 244/134 F
See application file for complete search history.

(56) References Cited

U.S. PATENT DOCUMENTS 3,474,659 A * 10/1969 Kelleher ................. 73/23.27
4,320,665 A 3/1982 Cain
4,696,191 A * 9/1987 Claytor et al. ............ 73/600
4,935,884 A * 6/1990 Hajicek ................... 702/159
5,441,051 A * 8/1995 Hileman et al. ........... 600/454
5,629,681 A * 5/1997 DuVall et al. ............. 340/665
6,010,095 A * 1/2000 Hackmeister ............. 340/583
6,205,376 B1 3/2001 Gordon
2003/0033879 A1* 2/2003 Adewumi et al. ........... 73/627
2005/0126294 A1* 6/2005 Bossi et al. ................. 73/629
2007/0280046 A1* 12/2007 Perez ......................... 367/13

OTHER PUBLICATIONS

Morgan, E.S., "Experience with the Acoustic Ranger—A Sound Method for Tube Inspection", Materials Evaluation, vol. 39, Sep. 1981, pp. 1-5.*

* cited by examiner

*Primary Examiner*—Dan Pihulic (57) ABSTRACT

Systems and methods for feedback protection of pressure measurement devices are disclosed. In one embodiment, a transmitter inside a pressure measurement device transmits a transmission signal directly or indirectly toward an ambient opening of the pressure measurement device. A reflection of the transmission signal is then received at a receiver and data associated with the transmission signal and the reflection of the transmission signal are examined to determine if an obstruction exists in the pressure measurement device.

19 Claims, 5 Drawing Sheets

FEEDBACK PROTECTION OF PRESSURE MEASUREMENT DEVICES

FIELD OF THE INVENTION

This invention relates to systems and methods for determining the proper functioning of pressure measurement devices such as Pitot probes, Pitot static probes, and static ports, and more specifically, to the use of transmitters and receivers to detect obstructions in pressure measurement devices.

BACKGROUND OF THE INVENTION

Modern aviation relies heavily on pressure measurement devices such as Pitot probes, Pitot static probes, and static ports to determine important flight characteristics such as the altitude, airspeed, and vertical speed of an aircraft. In order for a pressure measurement device to operate correctly, an ambient opening on the pressure measurement device must be kept clear, as must be an internal airway within the pressure measurement device. This can often be difficult given objects which are regularly encountered by pressure measurement systems during operation, such as mud, condensation, debris from bird and insect strikes, volcanic ash, and dust.

Blockage of pressure measurement devices may also result from human error, such as when a pressure measurement device is subjected to paints, or lubricants when maintenance personnel forget to place protective caps over the ambient opening of the pressure measurement device when the device is not in use. Moreover, maintenance personnel may forget to remove such a protective cap before the pressure measurement device is pressed into service.

Regardless of how an obstruction is introduced to a pressure measurement device, once present the obstruction can lead to the failure of the pressure measurement device. Presently, pressure measurement devices are checked visually by pilots and maintenance staff during down time and as part of a preflight checklist. Such visual checks may catch obstructions at or near the ambient opening, but may also miss obstructions found inside a pressure measurement device where an inspector's vision may be obscured.

SUMMARY OF THE INVENTION

Systems and methods for feedback protection of pressure measurement devices are disclosed. In one embodiment, a transmitter inside a pressure measurement device transmits a transmission signal directly or indirectly toward an ambient opening of the pressure measurement device. A reflection of the transmission signal is then received at a receiver and data associated with the transmission signal and the reflection of the transmission signal are examined to determine if an obstruction exists in the pressure measurement device.

BRIEF DESCRIPTION OF THE DRAWINGS

Embodiments are described in detail below with reference to the following drawings. The same numbers are used throughout the drawings to reference like features and components.

DETAILED DESCRIPTION

Feedback protection of pressure measurement devices is described in which embodiments provide for the examination of a pressure measurement device (e.g. a Pitot tube, a Pitot static probe, a static port, or any other pressure measurement device known in the art) to determine if an obstruction is present. In one embodiment, a transmitter inside a pressure measurement device transmits a transmission signal directly or indirectly toward an ambient opening of the pressure measurement device and a receiver receives a reflection of the transmission signal. Data associated with the transmission signal and the reflection of the transmission signal can then be examined to determine if an obstruction exists in the pressure measurement device.

Many specific details of certain embodiments are set forth in the following description and in FIGS. 1 through 5 to provide a thorough understanding of such embodiments. One skilled in the art, however, will understand that additional embodiments exist that are not shown, and that some of the embodiments may be practiced without several of the details described in the following description.

Exemplary Pitot Tube Feedback System

Figure 1:
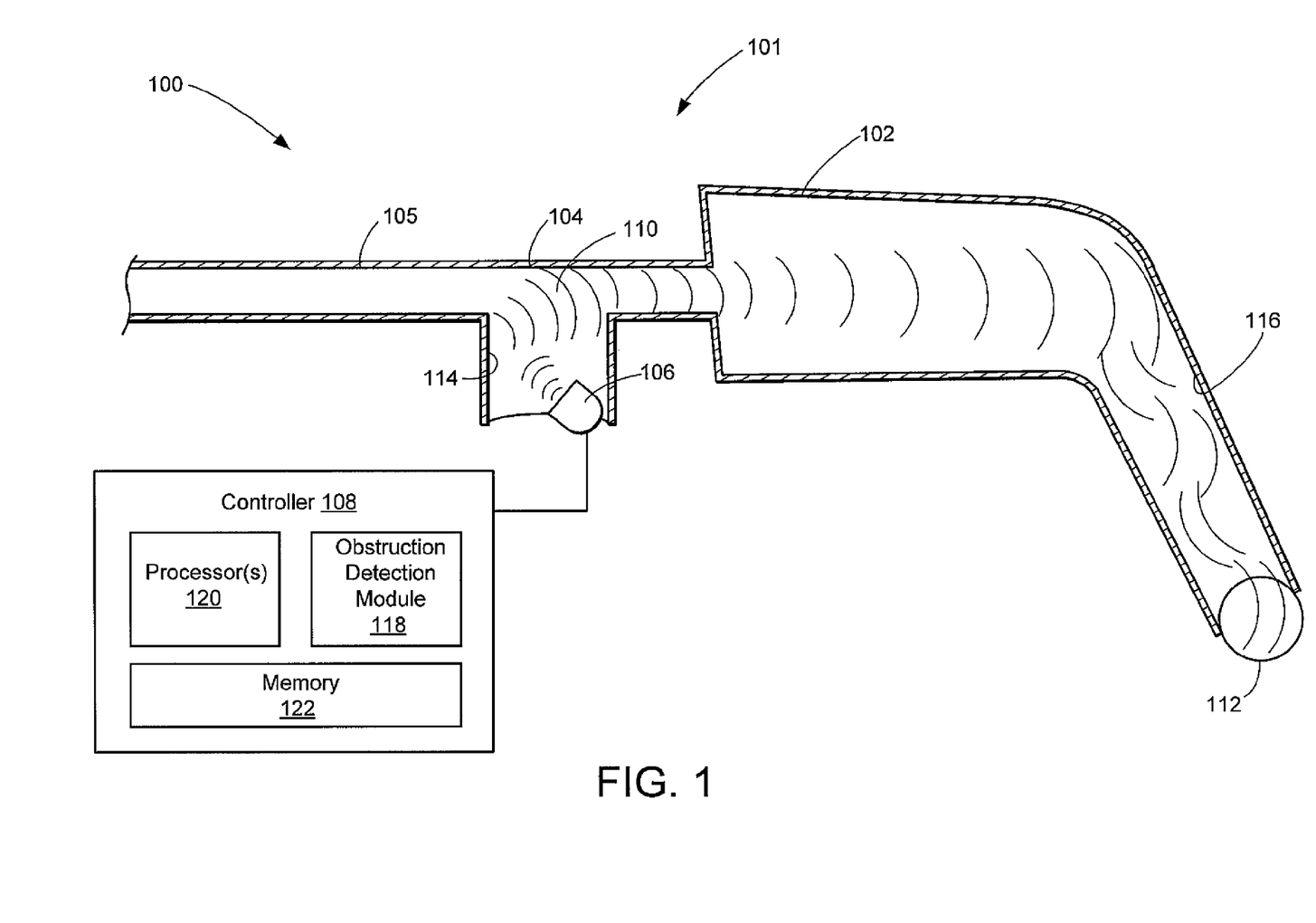
FIG. 1 illustrates a cross-sectional view of a Pitot tube with an exemplary feedback system.

FIG. 1 illustrates an exemplary Pitot tube feedback system 100 including a Pitot tube 101 (shown in cross-section), including a Pitot tube intake portion 102, a T-section 104, and a trailing portion 105. Pitot tube feedback system 100 also includes a transceiver 106 coupled to a controller 108. Transceiver 106 can be placed in T-section 104 and positioned such that a transmission signal 110 transmitted from transceiver 106 can be directed towards an ambient opening 112 of the Pitot tube intake portion 102. The transmission signal 110 may be reflected off one or more inner surfaces 114, 116 of T-section 104 and Pitot tube intake portion 102, respectively, before reaching ambient opening 112. It will be understood that transmission signal 110 may include ultrasonic energy as well as energy within the spectrum of radio frequencies and infrared frequencies, or any other suitable type of energy known in the art.

The exact placement and positioning of transceiver 106 in T-section 104 may vary. Moreover it will be understood that in at least one alternate embodiment, transceiver 106 may be placed outside of T-section 104, such as, for example, in trailing portion 105. Additionally, it will be understood that instead of transceiver 106, separate receiver and transmitter portions may be used in feedback system 100. These portions may be located together, performing like transceiver 106, or they may be placed apart. For example, a transmitter portion could be placed in T-section 104, while a receiver could be placed outside of T-section 104. In yet another possible embodiment, one or more transceivers and/or transmitter/receiver pairs, could be used.

In operation, feedback system 100 can be calibrated when Pitot tube intake portion 102 and T-section 104 are unobstructed, such as is shown in FIG. 1. Calibration can be instigated by controller 108, which can signal transceiver 106 to transmit transmission signal 110 toward ambient opening 112. Depending on the placement and positioning of transceiver 106, transmission signal 110 may be transmitted directly or indirectly toward ambient opening 112.

In one implementation, the command to transmit transmission signal 110 may be coupled to transceiver 106 by an obstruction detection module 118. It will be understood that controller 108 and obstruction detection module 118 can perform functions using one or more processors 120. Moreover, it will also be understood that controller 108 may exist as an independent computing-based device coupled to other devices, such as an air data computer (not shown for the sake of graphic clarity), or to a variety of other devices and subsystems of an aircraft. Alternately, controller 108 may be part of one or more other computing-based devices.

After receiving a transmission command, transceiver 106 can transmit transmission signal 110 for a period of time, then stop and receive a reflection of transmission signal 110 reflected back from ambient opening 112 to transceiver 106. The time necessary for transmission signal 110 to reach ambient opening 112 and reflect back to transceiver 106 can then be calculated by comparing a time of transmission of transmission signal 110 and a time of receipt of the reflection of transmission signal 110 at transceiver 106. This unobstructed propagation time can be saved by controller 108 and/or obstruction detection module 118 in a memory 122. The unobstructed propagation time can also be compared to an expected unobstructed propagation time calculated using a speed of transmission of transmission signal 110 and a round trip distance expected to be traveled by transmission signal 110 from transceiver 106 to ambient opening 112 and back again. For example, if the observed unobstructed propagation time is much shorter than the expected unobstructed propagation time, it can be inferred that an obstruction exists somewhere within T-section 104, Pitot tube intake portion 102, or trailing portion 105. The existence of such obstructions in T-section 104, Pitot tube intake portion 102, and/or trailing portion 105 will be discussed in more detail below with regard to FIG. 2.

In another exemplary embodiment, the strength of the reflection of transmission signal 110 received at transceiver 106 can also be used to yield calibration information concerning an unobstructed Pitot tube intake portion 102, T-section 104, or trailing portion 105. For example, the strength of the original transmission signal 110 transmitted by transceiver 106 can be compared to a strength of the reflection of transmission signal 110 received at transceiver 106. From this data an unobstructed signal attenuation value representing the difference in strength between the transmission signal 110 and the reflection of transmission signal 110 received at transceiver 106 may be stored to memory 122 by controller 108 and/or obstruction detection module 118. This unobstructed signal attenuation value may later be compared to signal attenuation values received during operation of Pitot tube intake portion 102.

For example, if during operation the difference between the strength of transmission signal 110 and the strength of the reflection of transmission signal 110 is less than the difference in strengths found in the unobstructed signal attenuation value, it can be inferred that an obstruction exists within T-section 104, Pitot tube intake portion 102, and/or trailing portion 105 reflecting transmission signal back to transceiver 106 before transmission signal 110 reaches ambient opening 112. Similarly, if the difference between the strengths of transmission signal 110 and reflection of transmission signal is more than the difference in strengths found in the unobstructed signal attenuation value, it can be inferred that an obstruction exists within T-section 104, Pitot tube intake portion 102, and/or trailing portion 105 absorbing transmission signal 110. The existence of such obstructions in T-section 104, Pitot tube intake portion 102, and/or trailing portion 105 will be discussed in more detail below with regard to FIG. 2.

Figure 2:
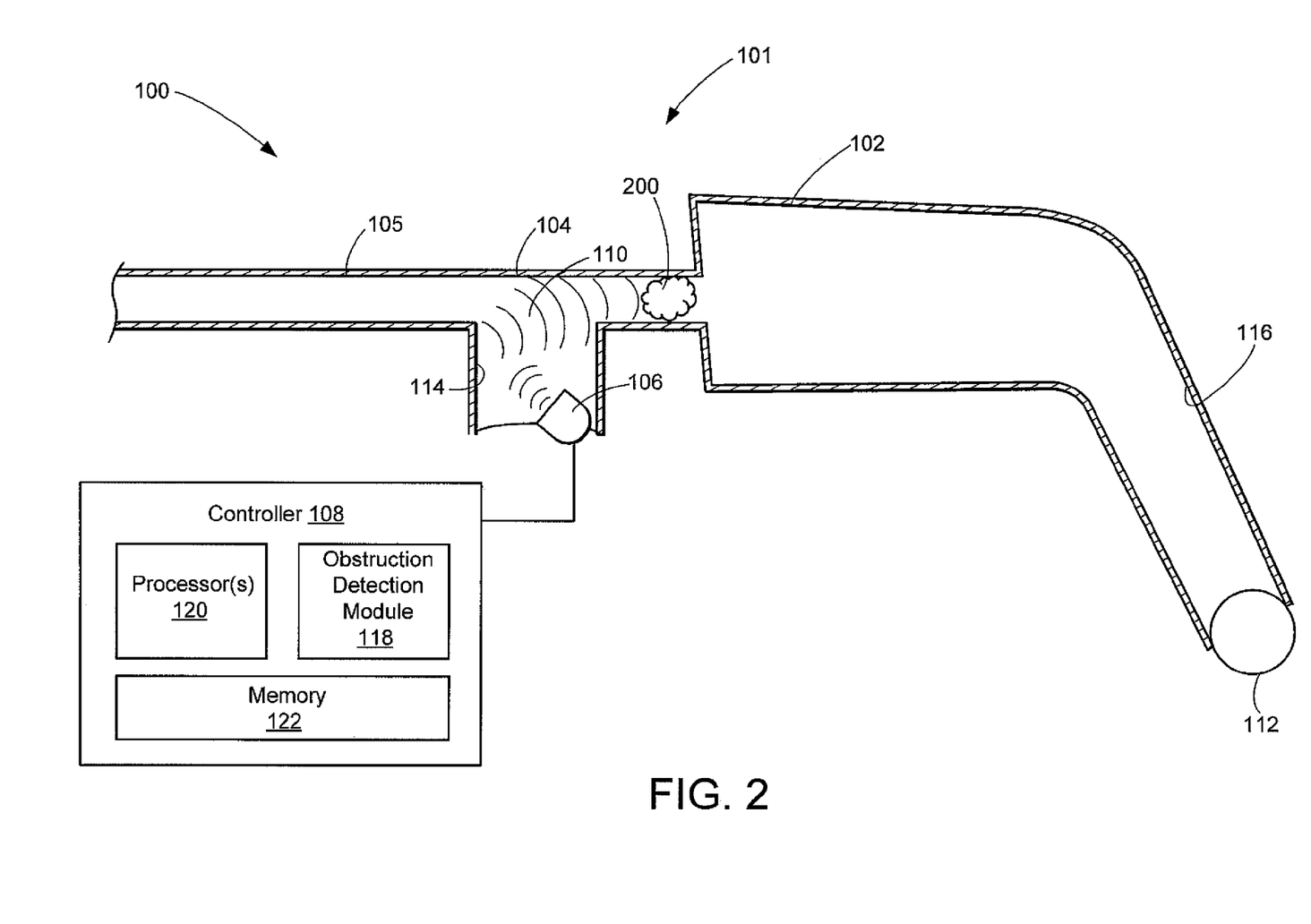
FIG. 2 illustrates a cross-sectional view of an obstructed Pitot tube with an exemplary feedback system.

FIG. 2 illustrates a cross-sectional view of exemplary Pitot tube feedback system 100 in which an obstruction 200 exists in T-section 104. Obstructions like obstruction 200 can result from a variety of factors, and may be made up of a variety of materials, including, for example, mud, condensation, debris from bird and insect strikes, volcanic ash, dust, paint, lubricant or any other material that might be encountered during the service life of a pressure measurement device. Moreover, as illustrated in FIG. 2, obstruction 200 can be far within the Pitot tube structure making it difficult to be detected using the naked eye.

In operation, transmission signal 110 transmitted by transceiver 106 toward ambient opening 112 would be at least partially reflected by obstruction 200 back to transceiver 106. An elapsed time between transmission of the transmission signal 110, and receipt of the reflection of transmission signal 110 could be calculated by controller 108 and/or obstruction detection module 118 and compared to the unobstructed propagation time and/or expected unobstructed propagation time. In the instant case, the observed propagation time of transmission signal 110 would be less than either the unobstructed propagation time or expected unobstructed propagation time, thus indicating the presence of obstruction 200 between transceiver 106 and ambient opening 112. As a result, obstruction detection module 118, for example, could issue an alert warning of the encountered obstruction to a pilot or an air data computer. Such a warning could enable the pilot, the air data computer, or any other device receiving the output of the system 100 to discount, or fully ignore, the airspeed and other readings rendered through use of Pitot tube 101.

In another possible embodiment, obstruction detection module 118 and/or controller 108 can calculate a signal attenuation value by comparing data regarding a signal strength of transmission signal 110 to a signal strength of the reflection of transmission signal 110 off of obstruction 200. This signal attenuation value could then be compared by obstruction detection module 118 and/or controller 108 to an unobstructed signal attenuation value, such as that discussed above. If a difference exists, an inference can be made by obstruction detection module 118 and/or controller 108 that obstruction 200 is present, and an alert can be issued by, for example, obstruction detection module 118, warning of the encountered obstruction. Again, such a warning can enable the pilot, the air data computer, or any other device receiving the output of the system 100 to discount, or fully ignore the airspeed and other reading being rendered by through use of Pitot tube 101.

In addition to the issuance of an alert as to the presence of obstruction 200, controller 108, obstruction detection module 118, and transceiver 106 may also be used to report information regarding the location, composition, and size of obstruction 200. For example, a greater strength of a reflected signal derived from transmission signal 110 may indicate that obstruction 200 is close to transceiver 106. Similarly, receipt of a highly attenuated reflection of transmission signal may indicate that obstruction 200 is very large, and includes materials which efficiently absorb energy of the type in transmission signal 110.

Efforts to locate the position and composition of obstruction 200 could be assisted through use of a predetermined table of known values for reflections of transmission signal 110 given the presence of a variety of obstructions at different locations and with different composition. With such a table, obstruction detection module 118 and/or controller 108 can compare data obtained from transmission signal 110 and a reflection of transmission signal 110 against similar data from the table to find estimate where obstruction 200 is, and what its composition is.

Moreover, it will be understood that several transmission signals 106 may be sent and received by transceiver 106 in order to determine the presence of obstruction 200. For example, several transmission signals 110 may be transmitted in succession by transceiver 106. Reflections of the transmission signals 110 may then be matched and differences between send and receipt times, as well as other quantities and qualities, including signal strengths, may be compared. In this way, for example, several test results may be averaged together for better accuracy of results.

Additionally, a plurality of transmission signals 110 may be transmitted including signals of varying energy types and or wavelengths. The differences between wavelengths and energy types may be selected to get a cross-section of transmission signal types which react differently to obstructions of different compositions. In this way, data from these various signals (and their reflections) can be used by obstruction detection module 118 and/or controller 108 to determine the composition of obstruction 200.

Exemplary Pitot Static Probe Feedback System

Figure 3:
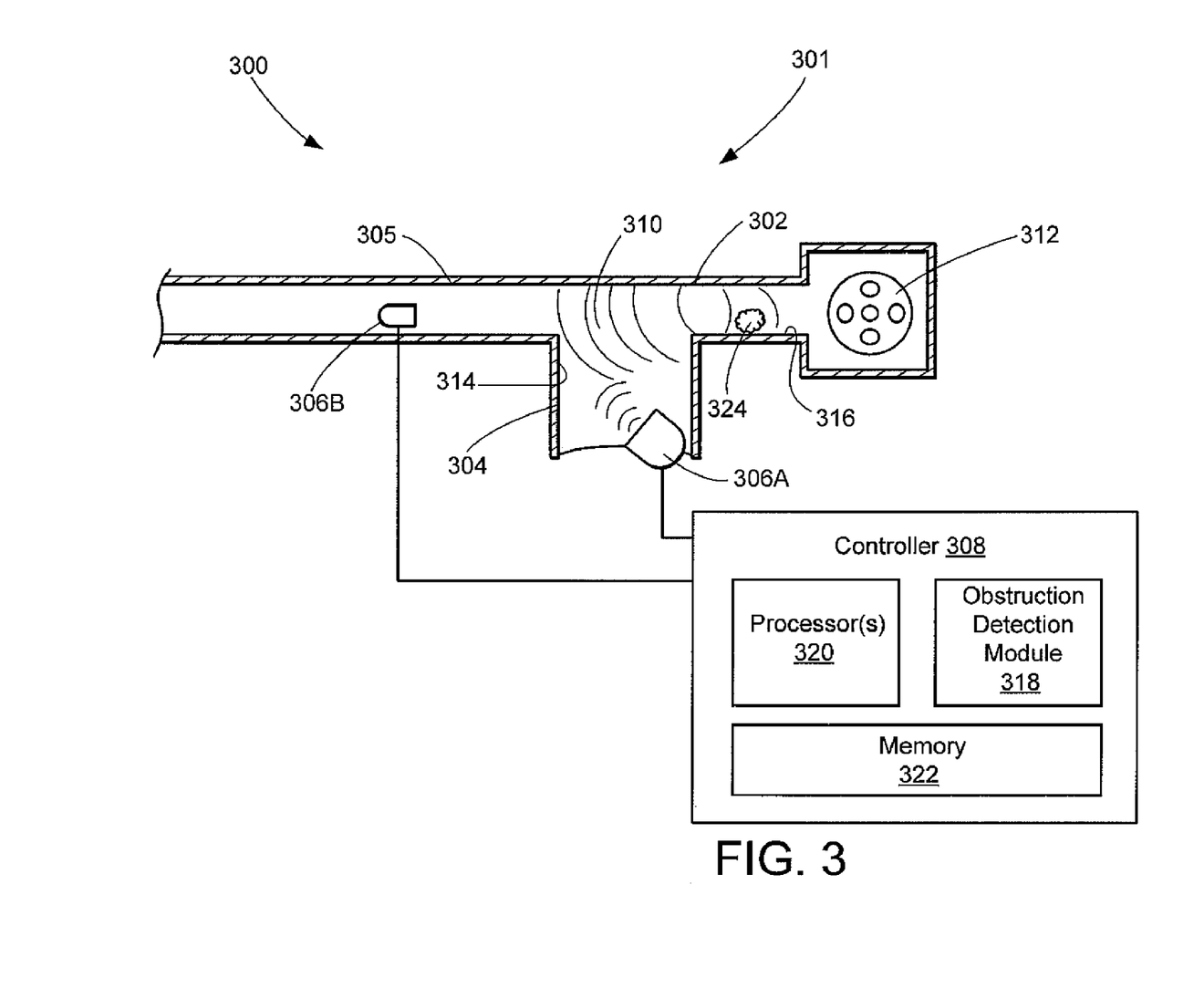
FIG. 3 illustrates a cross-sectional view of an obstructed static port with an exemplary feedback system.

FIG. 3 illustrates an exemplary Pitot static probe feedback system 300 having a Pitot static probe 301 including an intake portion 302, a T-section 304, and a trailing section 305 (shown in cross-section). Pitot static probe feedback system 300 also includes a transceiver 306 coupled to a controller 308. Transceiver 306 can be placed in T-section 304 and positioned such that transmission signal 310 transmitted from transceiver 306 can be directed towards an ambient opening 312 of intake portion 302. Transmission signal 310 may be reflected off one or more inner surfaces 314, 316 of T-section 304 and intake portion 302, respectively, before reaching ambient opening 312. It will be understood that transmission signal 310 may include ultrasonic energy as well as energy within the spectrum of radio frequencies and infrared frequencies, or any other suitable type of energy known in the art.

The placement and positioning of transceiver 306 may vary. For instance, in addition to being placed in T-section 304, such as transceiver 306A in FIG. 3, transceiver 306 may also be placed outside of T-section 304. For example, transceiver 306B can be placed in a trailing portion 305. In such an instance, transceiver 306B can be positioned to have a straight shot at ambient opening 312 and transmit an infrared transmission signal 310 directly toward ambient opening 312. It will also be understood that one or more transceivers 306 may be used in Pitot static probe feedback system 300. For example, transceivers such as 306A and 306B may be used at the same time.

Additionally, it will be understood that instead of transceiver 306, separate receiver and transmitter portions may be used in feedback system 300. These portions may be located together, performing like transceiver 306, or they may be placed apart. For example, a transmitter portion can be placed in T-section 304, while a receiver can be placed in trailing portion 305. In yet another possible embodiment, one or more transceivers and/or transmitter/receiver pairs, can be used.

In operation, feedback system 300 can be calibrated when intake portion 302, T-section 304, and trailing portion 305 are unobstructed. Calibration can be instigated by controller 308, which can signal transceiver 306 to transmit transmission signal 310 toward ambient opening 312. In one implementation, the command to transmit transmission signal 310 may be coupled to transceiver 306 by an obstruction detection module 318. It will be understood that controller 308 and obstruction detection module 318 can perform functions using one or more processors 320.

Moreover, it will also be understood that controller 308 may exist as an independent computing-based device coupled to other devices, such as an air data computer (not shown for the sake of graphic clarity), or to a variety of other devices and sub-systems of an aircraft. Alternately, controller 308 may be part of one or more other computing-based devices.

After receiving a transmission command, transceiver 306 can transmit transmission signal 310 for a period of time, then stop and receive a reflection of transmission signal 310 reflected back from ambient opening 312 to transceiver 306. The time necessary for transmission signal 310 to reach ambient opening 312 and reflect back to transceiver 306 can then be calculated by comparing a time of transmission of transmission signal 310 and a time of receipt of the reflection of transmission signal 110 at transceiver 306. This unobstructed propagation time can be saved by controller 308 and/or obstruction detection module 318 in a memory 322. The unobstructed propagation time can also be compared to an expected unobstructed propagation time calculated using a speed of transmission of transmission signal 310 and a round trip distance traveled by transmission signal 310 from transceiver 306 to ambient opening 312 and back again. For example, if the observed unobstructed propagation time is much shorter than the expected unobstructed propagation time, it can be inferred that an obstruction exists somewhere within either T-section 304, intake portion 302, or trailing portion 305.

In another exemplary embodiment, the strength of the reflection of transmission signal 310 received at transceiver 306 can also be used to yield calibration information concerning an unobstructed intake portion 302, T-section 304, and trailing portion 305. For example, the strength of the original transmission signal 310 transmitted by transceiver 306 can be compared to a strength of the reflection of transmission signal 310 received at transceiver 306. From this data an unobstructed signal attenuation value representing the difference in strength between the transmission signal 310 and the reflection of transmission signal received at transceiver 306 may be stored to memory 322 by controller 308 and/or obstruction detection module 318. This unobstructed signal attenuation value may later be compared to signal attenuation values received during operation of intake portion 302.

For example, if during operation the difference between the strengths of transmission signal 310 and reflection of transmission signal 310 is less than the difference in strengths found in the unobstructed signal attenuation value, it can be inferred that an obstruction exists within T-section 304, intake portion 302, and/or trailing portion 305 reflecting transmission signal back to transceiver 306 before transmission signal 310 reaches ambient opening 312. Similarly, if the difference between the strengths of transmission signal 310 and reflection of transmission signal 310 is more than the difference in strengths found in the unobstructed signal attenuation value, it can be inferred that an obstruction exists within T-section 304, intake portion 302, or trailing portion 305 absorbing transmission signal 310.

FIG. 3 also includes an obstruction 324 within intake portion 302. Obstructions like obstruction 324 can result from a variety of factors, and be made up of a variety of materials, including, for example, mud, condensation, debris from bird and insect strikes, volcanic ash, dust, paint, lubricant or any other material that might be encountered during the service life of a pressure measurement device.

In operation, transmission signal 310 transmitted by transceiver 306 toward ambient opening 312 would be at least partially reflected by obstruction 324 back to transceiver 306. An elapsed time between transmission of the transmission signal 310, and receipt of the reflection of transmission signal 310 could be calculated by controller 308 and/or obstruction detection module 318 and compared to the unobstructed propagation time and/or expected unobstructed propagation time. In the instant case, the observed propagation time of transmission signal 310 would be less than either the unobstructed propagation time or expected unobstructed propagation time, thus indicating the presence of obstruction 324 between transceiver 306 and ambient opening 312. As a result, obstruction detection module 318, for example, could issue an alert warning of the encountered obstruction such to a pilot or an air data computer. Such a warning could enable either the pilot, the air data computer, or other device or sub-system, to discount, or fully ignore, the airspeed and other readings being rendered by through use of the intake portion 302, T-section 304, and trailing portion 305.

In another possible embodiment, obstruction detection module 318 and/or controller 308 could calculate a signal attenuation value by comparing data regarding a signal strength of transmission signal 310 to a signal strength of the reflection of transmission signal 310 off of obstruction 324. This signal attenuation value could then be compared by obstruction detection module 318 and/or controller 308 to an unobstructed signal attenuation value, such as that discussed above. If a difference exists, an inference can be made by obstruction detection module 318 and/or controller 308 that obstruction 324 is present, and an alert can be issued by, for example, obstruction detection module 318, warning of the encountered obstruction. Such a warning could enable either the pilot, the air data computer, or any other device or sub-system to discount, or fully ignore, the airspeed and other reading being rendered by through use of the intake portion 302, T-section 304, and trailing portion 305.

In addition to the issuance of an alert as to the presence of obstruction 324, controller 308 and transceiver 306 may also be used to report information regarding a location, composition, and size of obstruction 324. For example, a greater strength of a reflected signal derived from transmission signal 310 would indicate that obstruction 324 is close to transceiver 306. Similarly, receipt of an attenuated reflection of transmission signal could indicate that obstruction 324 is very large and includes materials which efficiently absorb energy of the type included in transmission signal 310.

Efforts to locate the position and composition of obstruction 324 can be assisted through use of a pre-made table of known values for reflections of transmission signal 310 given the presence of a variety of obstructions at different locations and with different compositions. With such a table, obstruction detection module 318 and/or controller 308 could compare data obtained from transmission signal 310 and a reflection of transmission signal 310 against similar data from the table to estimate where obstruction 324 is, and what its composition is.

Moreover, it will be understood that several transmission signals 306 may be sent and received by transceiver 306 in order to determine the presence of obstruction 324. For example, transmission signals 310 may be transmitted several times in succession by transceiver 306. Reflections of the transmission signals 310 may then be matched and differences between send and receipt times, as well as other quantities and qualities, including signal strengths, may be compared. In this way, for example, several test results may be averaged together for better accuracy of results.

Additionally, a plurality of transmission signals 310 may be transmitted including signals of varying energy types and or wavelengths. The differences between wavelengths and energy types may be selected to get a range of transmission signal types which react differently to obstructions of different types. In this way, data from these various signals (and their reflections) can be used by obstruction detection module 318 and/or controller 308 to determine the material composition of obstruction 324.

Exemplary Method

Figure 4:
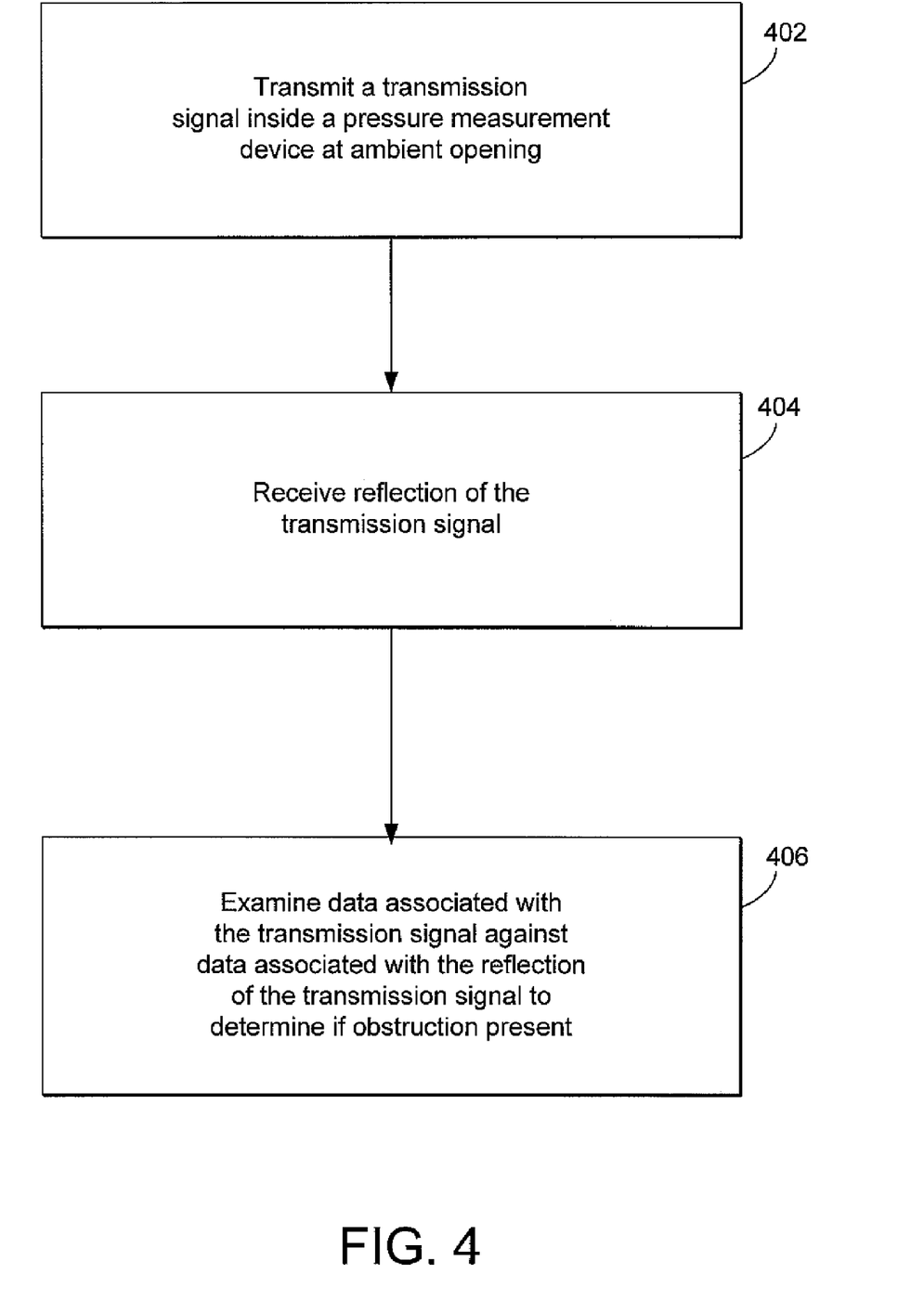
FIG. 4 illustrates exemplary method(s) for feedback protection of pressure measurement devices.

FIG. 4 illustrates an exemplary method 400 for feedback protection of pressure measurement devices and is described with reference to exemplary Pitot tube feedback system 100 shown in FIGS. 1-2 and exemplary Pitot static probe feedback system 300 shown in FIG. 3. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 402, a transmission signal is transmitted inside a body of a pressure measurement device toward an ambient opening of the pressure measurement device. For example, transceiver 306A can transmit transmission signal 310 indirectly toward ambient opening 312, by bouncing transmission signal 310 off inner surfaces 314, 316 of T-section 304 and intake portion 302, respectively. In another possible embodiment, transceiver 306B can transmit transmission signal directly toward ambient opening 312, avoiding contact with inner surfaces 314, 316.

At block 404, a reflection of the transmission signal is received. In one embodiment, the reflection is from inner surfaces of the pressure measurement device itself. In another possible embodiment, the reflection is from an obstruction within the pressure measurement device. Data associated with the reflection of the transmission signal can also be received at block 404. For example, the time at which the reflection of the transmission signal is received, as well as the relative strength of the reflection of the transmission signal, can be recorded. These values may be compared to the time at which the transmission signal was sent as well as the strength of the transmission signal that was sent.

For example, transceiver 106 can receive the reflection of transmission signal 110. Transmission signal 110 may be reflected back from the ambient opening 112 if no obstruction exists in the body of the pressure measurement device being tested. Alternately, transmission signal 110 may be reflected back to transceiver 106 by an obstruction, such as obstruction 200, within the body of the pressure measurement device being tested.

At block 406, data associated with the transmission signal can be examined against data associated with the reflection of the transmission signal to determine if an obstruction is present in the body of the pressure measurement device. For example, if the reflection of the transmission signal is received before a comparable reflection of the transmission signal reflected from the ambient opening would be received, then it can be inferred that the observed reflection of the transmission signal reflected off of an obstruction. Given this, method 400 can conclude that an obstruction exists within the pressure measurement device being tested.

Similarly, if strength the received reflection of the transmission signal is greater or less than what might be expected if the transmission signal reflected off of the ambient opening in an obstruction free pressure measurement device, then it can be inferred that the observed reflection of the transmission signal reflected off of an obstruction. In this case, method 400 can conclude that an obstruction exists within the pressure measurement device being tested.

In one embodiment, baseline reflected signal data can be collected by transmitting a transmission signal towards an ambient opening of a pressure measurement device which is known to be free of obstructions. This baseline data can later be compared against observed data collected from subsequently received reflections of transmission signals. If differences between the baseline and observed data exist, the differences may be attributed to obstructions existing inside the body of the pressure transmission device. Moreover, the differences may also be examined for data concerning the position and material composition of the obstruction(s) inside the body of the pressure measurement device.

Exemplary Computing-Based Device

Figure 5:
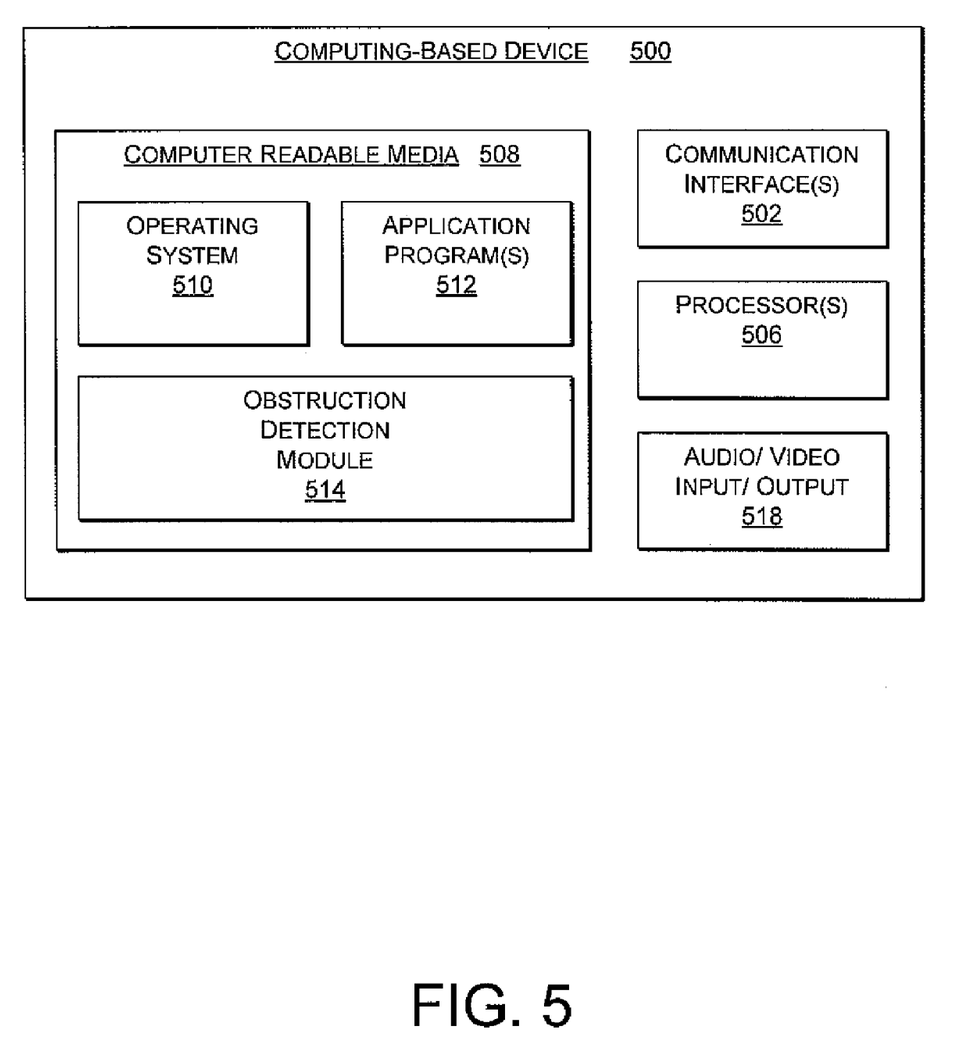
FIG. 5 illustrates an exemplary computing-based device in which embodiments of feedback protection of pressure measurement devices can be implemented.

FIG. 5 illustrates various components of an exemplary computing-based device 500 which can be implemented as any form of a computing and/or electronic device, and in which embodiments of feedback protection of pressure measurement devices can be implemented. For example, the computing-based device 500 can be implemented as controller 108 in FIGS. 1 and 2 and/or as controller 308 shown in FIG. 3.

Computing-based device 500 includes one or more communication interface(s) 502 which can be implemented as any one or more of a serial and/or parallel interface, a wireless interface, any type of network interface, and as any other type of communication interface. A network interface provides a connection between the computing-based device 500 and a communication network by which other electronic and computing-based devices can communicate data with device 500. Similarly, a serial and/or parallel interface provides for data communication directly between computing-based device 500 and the other electronic or computing devices.

Computing-based device 500 also includes one or more processors 506 (e.g., any of microprocessors, controllers, and the like) which process various computer executable instructions to control the operation of computing-based device 500, to communicate with other electronic and computing devices, and to process instructions and data in conjunction with the obstruction detection module 118 shown in FIGS. 1 and 2, and obstruction detection module 318 shown in FIG. 3.

Computing-based device 500 can also be implemented with computer-readable media 508, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 508 provides data storage mechanisms to store various information and/or data such as software applications and any other types of information and data related to operational aspects of computing-based device 500. For example, an operating system 510 and/or other application programs 512 can be maintained as software applications with the computer-readable media 508 and executed on processor(s) 506. The application programs 512 can include obstruction detection module 514 programmed to implement embodiments of feedback protection of pressure measurement devices. In one embodiment, obstruction detection module 514 is an example of the obstruction detection module 118 shown in FIGS. 1 and 2. In another embodiment obstruction detection module 514 is an example of the obstruction detection module 318 shown in FIG. 3.

The computing-based device 500 may also include an audio and/or video output 518 that provides audio and video to an audio rendering and/or display system, or to other devices that process, display, and/or otherwise render audio, video, and image data. As a portable device, video signals and audio signals can be communicated to an integrated display device and to integrated audio rendering components.

CONCLUSION

Although embodiments of feedback protection of pressure measurement devices have been described in language specific to structural features and/or methods, it is to be understood that the appended claims are not necessarily limited to the specific features or methods described. Rather, the specific features and methods are disclosed as exemplary implementations of feedback protection of pressure measurement devices.

What is claimed is:

1. An apparatus for measuring a pressure of an environment, comprising:
    a pressure measuring device coupled to a first end portion of an elongated channel, the elongated channel having an exit aperture spaced apart from the pressure measuring device and coupled to the environment; and
    an obstruction detection assembly, including:
        a transmitter configured to transmit a transmission signal along the elongated channel;
        a receiver configured to receive a reflection signal propagating back along the elongated channel; and
        an obstruction detection module operatively coupled to the receiver and being configured to analyze the reflection signal to determine if an obstruction exists in the channel.

2. The apparatus of claim 1, wherein the obstruction detection module is configured to analyze at least one of a time of propagation of the reflection signal, and a strength of the reflection signal, to determine if an obstruction exists in the channel.

3. The apparatus of claim 1, wherein the obstruction detection module includes a processor operatively coupled to a memory device, the processor being configured to compare the reflection signal with a predetermined table stored in the memory device to determine if an obstruction exists in the channel.

4. The apparatus of claim 1, wherein the obstruction detection module is operatively coupled to the transmitter, and includes a processor configured to compare the transmission signal to the reflection signal to analyze at least one of a time of propagation of the reflection signal and a strength of the reflection signal, to determine if an obstruction exists in the channel.

5. The apparatus of claim 1, wherein the pressure measuring device includes at least one of: a Pitot probe; a Pitot static probe; a static port.

6. The apparatus of claim 1, wherein the transmission signal and the reflection signal comprise ultrasonic signals.

7. The apparatus of claim 1, wherein the pressure measurement device is a Pitot static probe having an ambient opening, and further wherein the transmission signal includes an infrared signal aimed at the ambient opening.

8. A method, comprising:
   transmitting a transmission signal from inside a pressure measurement device at an ambient opening of the pressure measurement device;
   receiving a reflection of the transmission signal; and
   using a processor to examine data associated with the transmission signal against data associated with the reflection of the transmission signal to determine if an obstruction exists in the pressure measurement device.

9. The method of claim 8, wherein transmitting comprises bouncing the transmission signal off of at least one inner wall of the pressure measurement device to indirectly transmit the transmission signal towards the ambient opening.

10. The method of claim 8, wherein receiving comprises receiving the reflection of the transmission signal at a same point where the transmission signal was transmitted.

11. The method of claim 8, wherein examining comprises determining a time between transmitting and receiving.

12. The method of claim 8, wherein examining comprises determining a time difference between transmitting and receiving, and calculating a distance traveled by the transmission signal and the reflection of the transmission signal and comparing that distance to a length of the pressure measurement device from where transmitting took place to the ambient opening and from the ambient opening to where receiving took place.

13. The method of claim 8, wherein examining comprises examining the data associated with the transmission signal against the data associated with the reflection of the transmission signal to determine where an obstruction exists, and how much of an inner cross-sectional area of the pressure measurement device the obstruction blocks.

14. The method of claim 8, wherein examining comprises examining the data associated with the transmission signal against the data associated with the reflection of the transmission signal to determine a material composition of an obstruction in the pressure measurement device.

15. The method of claim 8, further comprising:
   transmitting a calibration transmission signal from inside the pressure measurement device towards an ambient opening of the pressure measurement device when the pressure measurement device is unobstructed;
   receiving a calibration reflection of the transmission signal; and examining data associated with the calibration transmission signal against data associated with the calibration reflection of the transmission signal to determine baseline differences between the data when the pressure measurement device is in an unobstructed state.

16. A method of feedback protection of a pitot static system comprising:
   transmitting a transmission signal from inside a pressure measurement device of the pitot static system, at an ambient opening of the pressure measurement device;
   receiving a reflection of the transmission signal within a tube of the pitot static system; and
   examining data associated with the transmission signal against data associated with the reflection of the transmission signal the tube of the pitot static system to determine if an obstruction exists in the pressure measurement device.

17. A pressure measurement system comprising:
   a Pitot probe having an internal passageway that terminates at an ambient opening;
   a transmitter and receiver placed within and integrated with the Pitot probe for transmitting acoustic energy toward the ambient opening, detecting reflected energy, and generating a signal representing the detected energy; and
   a processor programmed to process the signal to provide feedback about any obstruction in the internal passageway and the ambient opening.

18. The system of claim 17, wherein the Pitot probe provides pressure measurements for an aircraft; and wherein an air data computer (ADC) is used to initiate operation of the transmitter and use the feedback to generate in-flight notification as to whether measurements by the Pitot probe are reliable.

19. The system of claim 17, wherein the transmitter and receiver are placed in a T-section of the Pitot probe.

\* \* \* \* \*